Figure 4:
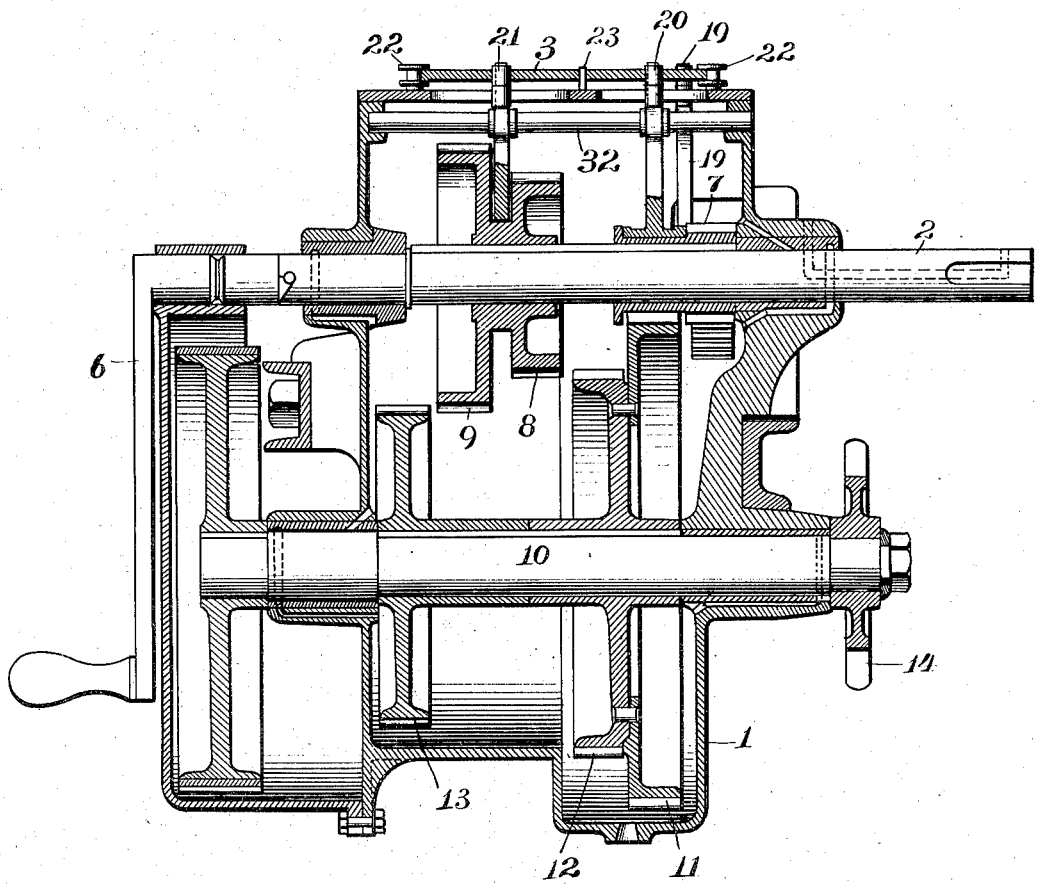

No. 712,583. Patented Nov. 4, 1902.
J. W. PACKARD & W. A. HATCHER.
CONTROLLING MECHANISM FOR MOTOR VEHICLES.
(Application filed Feb. 12, 1902.)
(No Model.) 2 Sheets—Sheet 1.
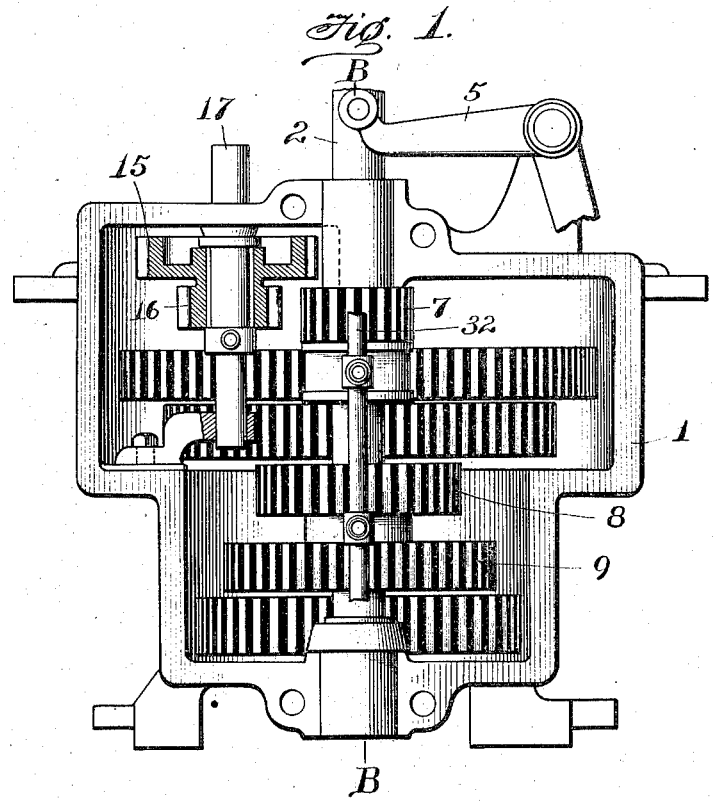
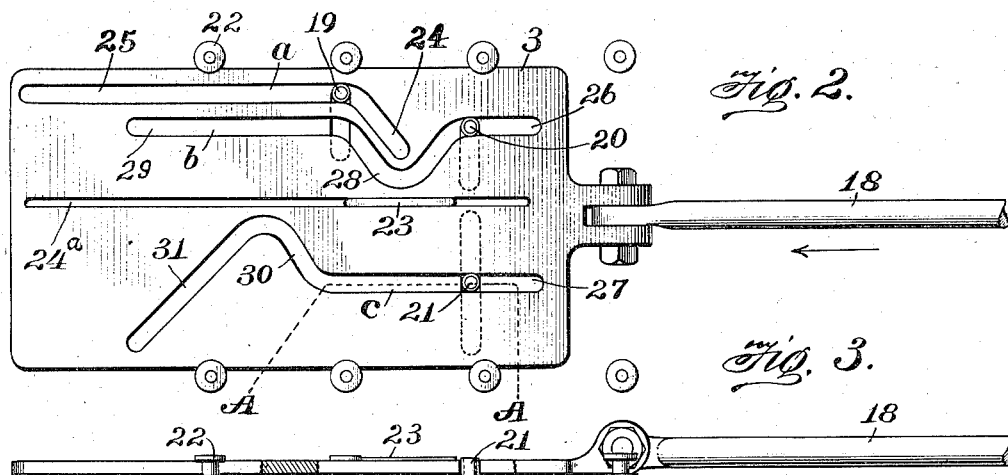
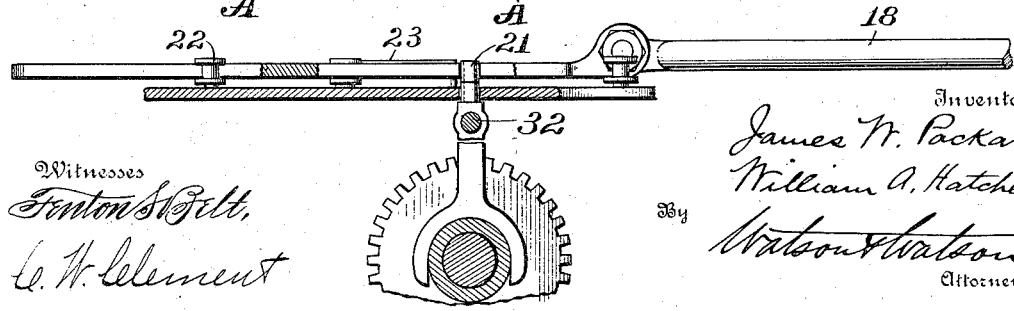
Witnesses
Fenton S. Belt,
C. W. Clement
Inventors
James W. Packard
William A. Hatcher
By Watson & Watson
Attorneys

UNITED STATES PATENT OFFICE.

JAMES W. PACKARD AND WILLIAM A. HATCHER, OF WARREN, OHIO, ASSIGNORS TO OHIO AUTOMOBILE COMPANY, OF WARREN, OHIO, A CORPORATION OF WEST VIRGINIA.

CONTROLLING MECHANISM FOR MOTOR-VEHICLES.

SPECIFICATION forming part of Letters Patent No. 712,583, dated November 4, 1902.

Application filed February 12, 1902. Serial No. 93,756. (No model.)

*To all whom it may concern:*

Be it known that we, JAMES W. PACKARD and WILLIAM A. HATCHER, citizens of the United States, residing at Warren, in the county of Trumbull, State of Ohio, have invented certain new and useful Improvements in Controlling Mechanism for Motor-Vehicles, of which the following is a specification.

This invention comprises improvements in devices for controlling the movements of motor-vehicles; and it relates to means whereby the vehicle may be stopped, started, and reversed and its speed controlled by the simple forward-and-back movement of a controlling-lever.

In the accompanying drawings, which illustrate the invention, Figure 1 is a plan view, partly in section, of the speed-changing and reversing gearing arranged within a casing, the top of the latter being removed. Fig. 2 is a plan view of the cam-plate for effecting the various combinations of gearing. Fig. 3 is a section of the line A A of Fig. 2, and Fig. 4 is a vertical section through the gear-casing on the line B B of Fig. 1.

Referring to the drawings, 1 indicates a casing, within which the gearing is arranged. Extending through the upper portion of the casing is a driving-shaft 2, which may be thrown into and out of engagement with the engine-shaft by means of a suitable clutch operated by a lever 5. A hand-crank 6 is also arranged at one end of the driving-shaft for the purpose of starting an explosive-engine. Keyed to the driving-shaft 2 and movable longitudinally thereon is a small gear 7 and two connected gears 8 and 9 of successively greater diameters. Fixed to a driven shaft 10, which extends through the lower part of the casing parallel with the driving-shaft, are three gears 11, 12, and 13, having successively smaller diameters. The smallest gear 7 upon the driving-shaft is movable into engagement with the largest gear 11 upon the driven shaft, whereby the latter may be moved at a slow speed, and the gears 8 and 9, which are connected together, may be moved so that the gear 8 will engage the gear 12 for an intermediate speed, or the gear 9 may be made to engage the gear 13 for high speed. The gears 12 and 13 are separated from one another by a distance greater than the combined width of the connected gears 8 and 9 in order to prevent the latter from engaging both of said gears 12 and 13 at the same time. In the extreme right and left positions of the gears 8 and 9, therefore, (referring to Fig. 4,) one of said gears will be in engagement with its co-operating gear upon the driven shaft, and in the mid-position the gears will be out of engagement. A sprocket-wheel or other gear 14 is arranged upon the driven shaft and adapted to be connected by a chain or otherwise with the driving-axles of the vehicle. Reversing-gears 15 and 16 are fixed upon a longitudinally-movable shaft 17, which is parallel with the driving-shaft. These gears 15 and 16 are adapted to be moved into and out of engagement with the gears 7 and 11, respectively, when the shaft 17 is moved longitudinally in its bearings. When said gears 15 and 16 are in engagement with the gears 7 and 11, it will be obvious that the direction of rotation of the driven shaft will be reversed.

The various combinations of gears to effect the stopping, starting, and reversing of the driven shaft are effected by means of the movement of a cam-plate 3, arranged upon the top of the casing and movable transversely of the shafts by means of a rod or link 18, which is connected to a suitable hand-lever under the control of the operator. This cam-plate is provided with three cam-slots *a*, *b*, and *c*, into which project the upper ends of the shifting forks or arms 19, 20, and 21, respectively. The shifting-arm 19 is connected with the shaft 17 and adapted when moved laterally to shift said shaft and the reversing-gears. The arm 20 is arranged to shift the gear 7, and the arm 21 is arranged to shift the gears 8 and 9. Suitable devices are provided for guiding the plate in its longitudinal movement and preventing lateral movement, such as the rollers 22 and guide projection 23, which extends upwardly from the casing through a longitudinal guide-slot 24ª in the plate. The cam-slots *a*, *b*, and *c* each have portions parallel with one another and extending longitudinally of the plate. In the normal position of the plate relatively to the shafts—namely, that shown in Fig. 2—the projecting ends of the arms 19, 20, and 21 will each lie within parallel portions of their respective slots. In this position of the plate all of the gears will be out of mesh. The slot a has at its forward end a cam portion 24, inclined inwardly from the line of the rear straight portion 25, while the forward ends 26 and 27 of the slots b and c, respectively, are straight and parallel with one another. It will be seen that when the plate is moved rearwardly in the direction of the arrow from the position which it occupies in Fig. 2 the arm 19 will be moved laterally by the cam portion 24 of the slot a, while the arms 20 and 21 will not be affected. This movement of the arm 19 throws the reversing-gears 15 and 16 into engagement with their coöperating gears and causes reverse movement of the driven shaft and vehicle. The return of the plate to the position shown in Fig. 2 moves the arm 19 laterally in the opposite direction, and thereby disengages the reversing-gears. The main portion 25 of the slot a, extending from its inclined end 24 rearwardly, is straight, so that further movement of the plate in the forward direction will not cause lateral movement of the arm 19. The slot b has a cam portion 28, inclined inwardly toward the center of the plate and thence outwardly, while the opposing portion of the slot c is perfectly straight. If the plate be moved forward from the position shown in Fig. 2, the arm 20 will be moved inwardly toward the center of the plate, thus causing the engagement of the gears 7 and 11, and a further movement of the plate in the right-hand or forward direction will cause the arm 20 to move out of the cam portion of the slot, thereby disengaging the gears 7 and 11. The rear portion 29 of the slot b is straight and parallel with the slot a, and therefore a still further forward movement of the plate will not cause lateral movement of the arm 20. The rear portion of the slot c, however, is inclined inwardly toward the center of the plate, as shown at 30, and thence outwardly beyond the line of the straight portion of the slot, as shown at 31. This arrangement of the slot c causes the arm 21 to travel first inwardly as the plate is moved to the right, thus throwing the gears 8 and 12 into engagement, and a movement of the plate to the extreme right-hand or forward position causes the arm 21 to move laterally in the opposite direction far enough to disengage the gears 8 and 12 and to engage the gears 9 and 13.

It will be plain, therefore, that the several combinations of gearing necessary to reverse and change the speed of the vehicle, as well as to stop it, are accomplished by merely moving the plate forward and back, the backward movement of the plate from the normal position (shown in Fig. 2) causing a reversal of the vehicle and a forward movement from the normal position causing successive increases in speed and a reverse movement of the plate reversing these operations.

The arms or forks for shifting the gears are shown slidingly mounted upon a bar 32, extending through the upper part of the casing parallel with the gear-shafts. While the fixed gears are upon the driven shaft and the movable gears are upon the driving-shaft, in the drawings, it would of course be possible to reverse this arrangement, if desired.

Having thus described our invention, what we claim, and desire to secure by Letters Patent, is—

1. The combination with a driving-shaft and a parallel driven shaft, each having gears thereon and rotatable therewith, the gears upon one of the shafts being adjustable lengthwise thereof into and out of engagement with coöperating gears on the opposing shaft to effect change in speed, of devices for shifting the movable gears comprising a reciprocative cam-plate having cam slots or grooves therein, and shifting-arms engaging said slots and adapted to move the gears.

2. The combination with a driving-shaft and a parallel driven shaft, each having gears thereon and rotatable therewith, the gears upon one of the shafts being adjustable lengthwise thereof into and out of engagement with coöperating gears on the opposing shaft to effect changes in speed, of devices for shifting the movable gears comprising a reciprocative cam-plate movable transversely of the shafts and having cam slots or grooves therein, and shifting-arms engaging said slots and adapted to move the gears.

3. The combination with a driving-shaft and a parallel driven shaft, each having gears thereon and rotatable therewith, the gears upon one of the shafts being adjustable lengthwise thereof into and out of engagement with coöperating gears on the opposing shaft to effect changes in speed, of devices for shifting the movable gears comprising shifting-arms arranged to move the gears and a reciprocative cam-plate having longitudinal cam slots or surfaces arranged to engage said arms and operate the same.

4. The combination with a driving-shaft and a parallel driven shaft, each having gears thereon and rotatable therewith, the gears upon one of the shafts being adjustable into and out of engagement with coöperating gears on the opposing shaft to effect changes in speed, of devices for shifting the movable gears comprising shifting-arms operatively connected with the gears and a reciprocative cam-plate having longitudinal slots or grooves with which said arms engage, said slots having parallel portions and cam portions for moving said arms laterally in succession to effect successive changes in speed.

5. The combination with a driving-shaft and a parallel driven shaft each having gears thereon and rotatable therewith, the gears on one of the shafts being adjustable into and out of engagement with the coöperating gears on the opposing shaft, to effect changes in speed, and a reversing-gear shaft having reversing-gears thereon movable into and out of engagement with gears upon the driving and driven shafts to cause reversal of the latter, of devices for shifting the movable speed-changing and reversing gears comprising shifting-arms operatively connected with the gears and a reciprocative cam-plate having longitudinal slots or grooves which are engaged by said arm, said slots having cam portions for moving said arms laterally.

6. The combination with a driving-shaft and a parallel driven shaft each having gears thereon and rotatable therewith, the gears upon one of the shafts being adjustable lengthwise into and out of engagement with the coöperating gears on the opposing shaft, to effect changes in speed, and a reversing-gear shaft having reversing-gears thereon movable into and out of engagement with the gears upon the driving and driven shafts, to cause reversal of the latter, of devices for shifting the movable speed-changing and reversing gears comprising shifting-arms operatively connected with the gears and a reciprocative cam-plate having longitudinal slots or grooves with which said arms engage, said slots having cam portions arranged to move said arms successively to shift the gears.

7. The combination with a driving-shaft and a parallel driven shaft each having gears thereon and rotatable therewith, the gears upon one of the shafts being adjustable lengthwise into and out of engagement with the coöperating gears on the opposing shaft, to effect changes in speed, and a reversing-gear shaft having reversing-gears thereon movable into and out of engagement with gears upon the driving and driven shafts to cause reversal of the latter, of devices for shifting the movable speed-changing and reversing gears comprising shifting-arms operatively connected with said gears and a reciprocative cam-plate having longitudinal slots with which said arms engage, one of said slots having a cam portion arranged to move the reversing-gear arm when the plate is reciprocated at one side of its normal position and the other slots having cam portions adapted to move the speed-changing arms successively when the cam-plate is reciprocated at the other side of its normal position.

8. The combination with a driving-shaft and a parallel driven shaft, of a pair of gears having different diameters on one of said shafts and movable together lengthwise thereof, and a pair of coöperating gears fixed upon the opposing shaft, said fixed gears being separated from one another by a distance greater than the combined width of the two movable gears, and means for engaging said movable gears alternately with their coöperating gears comprising a shifting-arm engaging the movable gears and a reciprocative cam-plate having a longitudinal slot or groove with which said arm engages, said slot having a straight part extending in the direction of movement of the plate and a cam portion inclined laterally in one direction from the line of the straight part of the slot and thence laterally across the said part in the opposite direction.

In testimony whereof we affix our signatures in presence of two witnesses.

JAMES W. PACKARD.
WILLIAM A. HATCHER.

Witnesses:
E. L. WARNER,
C. H. DUNLAP.